United States Patent
Howell et al.

(10) Patent No.: US 9,580,058 B2
(45) Date of Patent: Feb. 28, 2017

(54) DETERMINING INTEGRITY OF BRAKING CONTROL SYSTEM

(71) Applicant: AIRBUS OPERATIONS LIMITED, Bristol (GB)

(72) Inventors: George Howell, Bristol (GB); Matthieu Della Nave, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 14/802,719

(22) Filed: Jul. 17, 2015

(65) Prior Publication Data

US 2016/0016575 A1    Jan. 21, 2016

(30) Foreign Application Priority Data

Jul. 18, 2014   (GB) .................................. 1412794.8

(51) Int. Cl.
*B60T 17/22* (2006.01)
*B60T 8/32* (2006.01)
*B60T 13/66* (2006.01)

(52) U.S. Cl.
CPC ............ B60T 17/221 (2013.01); B60T 8/325 (2013.01); B60T 13/662 (2013.01)

(58) Field of Classification Search
CPC ....... B60T 17/221; B60T 8/325; B60T 13/662
See application file for complete search history.

(56) References Cited

U.S. PATENT DOCUMENTS

| | | | |
|---|---|---|---|
| 3,662,333 A | 5/1972 | Howard et al. | |
| 4,792,192 A | 12/1988 | Tveitane | |
| 4,834,465 A | 5/1989 | Guichard et al. | |
| 5,397,173 A | 3/1995 | Bourguet | |
| 5,762,407 A * | 6/1998 | Stacey ................... | B60T 7/042 303/113.4 |
| 6,513,885 B1 | 2/2003 | Salamat et al. | |

(Continued)

FOREIGN PATENT DOCUMENTS

| | | |
|---|---|---|
| GB | 2470251 A | 11/2010 |
| WO | 2004022402 A1 | 3/2004 |
| WO | 2013142541 A2 | 9/2013 |

OTHER PUBLICATIONS

European Search Report in EP Application No. 15176909 dated Nov. 23, 2015.

*Primary Examiner* — Rodney Butler
(74) *Attorney, Agent, or Firm* — Hauptman Ham, LLP

(57) ABSTRACT

A method of determining the integrity of an electric or hydraulic energy source of a braking control system. The energy source is charged or discharged, and two or more measurements of voltage or hydraulic pressure are taken from the braking control system. A difference between at least two of the measurements is determined in order to determine a change or rate of change in voltage or hydraulic pressure caused by the charging or discharging of the energy source. The integrity of the energy source is determined by checking whether the change or rate of change in voltage or hydraulic pressure meets predetermined criteria. The check may comprise comparing the change or rate of change of the voltage or hydraulic pressure to a threshold—for instance checking whether the change exceeds a threshold, or falls between an upper threshold and a lower threshold.

20 Claims, 4 Drawing Sheets

(56) References Cited

U.S. PATENT DOCUMENTS

| | | |
|---|---|---|
| 8,661,875 B2 | 3/2014 | Zhou |
| 2005/0057895 A1 | 3/2005 | Chen et al. |
| 2006/0017319 A1 | 1/2006 | Kohl et al. |
| 2008/0157590 A1 | 7/2008 | Godo |
| 2010/0090058 A1 | 4/2010 | Cahill et al. |
| 2010/0292889 A1 | 11/2010 | Cahill et al. |
| 2012/0235469 A1 | 9/2012 | Miyazaki et al. |
| 2015/0025737 A1* | 1/2015 | Hermsen ............... B60T 17/221 701/33.9 |
| 2016/0010663 A1* | 1/2016 | Zhang .................... E02F 9/128 60/413 |

* cited by examiner

DETERMINING INTEGRITY OF BRAKING CONTROL SYSTEM

RELATED APPLICATIONS

The present application claims priority from Great Britain Application Number 1412794.8, filed Jul. 18, 2014, the disclosure of which is hereby incorporated by reference herein in its entirety.

FIELD OF THE INVENTION

The present invention relates to a method of determining the integrity of a braking control system including an electric or hydraulic energy source. Preferably, but not exclusively, the braking control system is an aircraft braking control system.

BACKGROUND OF THE INVENTION

A hydraulic braking control system of an aircraft is described in U.S. Pat. No. 4,834,465A. The system includes an emergency circuit including a hydraulic accumulator. A pressure sensor of the emergency circuit triggers an alarm when the pressure in the emergency circuit is too low.

SUMMARY OF THE INVENTION

A first aspect of the invention provides a method of determining the integrity of a braking control system, the braking control system comprising an electric or hydraulic energy source, the method comprising: charging or discharging the energy source; taking two or more measurements of voltage or hydraulic pressure from the braking control system; analysing at least two of the measurements in order to determine a change or rate of change in voltage or hydraulic pressure caused by the charging or discharging of the energy source; and determining the integrity of the system by checking whether the change or rate of change in voltage or hydraulic pressure meets predetermined criteria.

The invention can be contrasted with the process in U.S. Pat. No. 4,834,465 which only checks whether an absolute pressure value is too low. Such a low pressure value may be caused by a loss of integrity of the accumulator, but it may also be caused by a healthy accumulator having been full discharged. Thus the absolute pressure check of U.S. Pat. No. 4,834,465 cannot be used to reliably check the integrity of an accumulator.

Checking whether the change or rate of change in voltage or hydraulic pressure meets predetermined criteria may comprise comparing the change or rate of change of the voltage or hydraulic pressure to a threshold—for instance checking whether the change or rate of change exceeds a threshold, or falls between an upper threshold and a lower threshold.

The measurements may be taken at the same time as the energy source is charged/discharged and/or immediately before and after the energy source is charged/discharged.

The step of analysing at least two of the measurements may comprise determining a difference between the measurements in order to determine the change or rate of change in voltage or hydraulic pressure caused by the charging or discharging of the energy source.

Where a rate of change in voltage or hydraulic pressure is determined, then the rate of change may be a rate of change with respect to time, a rate of change with respect to hydraulic liquid volume, or some other rate of change parameter.

In one embodiment of the invention the method comprises discharging the energy source by a predetermined amount; taking a first measurement of voltage or hydraulic pressure from the braking control system before the energy source has been discharged by the predetermined amount; taking a second measurement of voltage or hydraulic pressure from the braking control system after the energy source has been discharged by the predetermined amount; determining a difference between the first and second measurements; and determining the integrity of the braking control system by checking whether the difference exceeds a threshold.

The braking control system may be an aircraft braking control system, or a braking control system for any other type of vehicle.

The method may be performed when the aircraft is on the ground, or during flight of the aircraft.

Typically the energy source is charged or discharged by operating a valve or switch.

Optionally the energy source is discharged by using it to operate one or more brakes. Alternatively, two accumulators or batteries may be installed in parallel and isolated relative to each other. One accumulator or battery is recharged and the isolation valve is then opened such that the change or rate of change in pressure or voltage on both accumulators (or both batteries) is measured to determine the integrity of the system.

Optionally the electric or hydraulic energy source is a secondary energy source, and the method further comprises supplying voltage or hydraulic pressure to a brake with a primary energy source, and isolating the secondary energy source from the brake so that the voltage or hydraulic pressure is supplied to the brake by the primary energy source and not by the secondary energy source. This provides redundancy which is particularly preferred in the case of an aircraft braking system. Alternatively, voltage or hydraulic pressure may be supplied to the brake by the primary energy source simultaneously with the secondary energy source but this is less preferred particularly in the case of an aircraft braking system.

In one embodiment the secondary energy source is charged and the change or rate of change in voltage or hydraulic pressure is an increase or rate of increase in voltage or hydraulic pressure. In this case the secondary energy source is typically isolated or decoupled from the brake as it is charged.

In one embodiment the electric or hydraulic energy source is a hydraulic accumulator, and the method further comprises supplying hydraulic pressure to the brake with a pump, and isolating the hydraulic accumulator from the brake with an accumulator selector valve so that the hydraulic pressure is supplied to the brake by the pump and not by the hydraulic accumulator. Optionally, in the event of failure of the pump, or if the pump is unavailable for some other reason, then the hydraulic pressure is supplied to the brake by the hydraulic accumulator via the accumulator selector valve.

Optionally the electric or hydraulic energy source is a secondary energy source, and the method further comprises supplying voltage or hydraulic pressure to a brake with a primary energy source; and when a fault is detected, decoupling the primary energy source from the brake and coupling the secondary energy source to the brake.

Typically the electric or hydraulic energy source has an output line for supplying voltage or hydraulic pressure to a brake, and the measurements of voltage or hydraulic pressure are taken from the output line.

In the case of a hydraulic energy source, then typically the hydraulic energy source comprises a hydraulic accumulator with a fluid separating device, hydraulic liquid on one side of the fluid separating device, and compressed gas on the other side of the fluid separating device, wherein the hydraulic accumulator has an output line containing hydraulic fluid and the measurements of hydraulic pressure are taken from the output line.

A second aspect of the invention provides a controller configured to determine the integrity of a braking control system by the method of the first aspect of the invention. The controller typically comprises a suitably programmed computer controller. The controller is configured to determine the integrity of the braking control system by charging or discharging the energy source; taking two or more measurements of voltage or hydraulic pressure from the braking control system; analysing at least two of the measurements in order to determine a change or rate of change in voltage or hydraulic pressure caused by the charging or discharging of the energy source; and determining the integrity of the system by checking whether the change or rate of change in voltage or hydraulic pressure meets predetermined criteria.

A third aspect of the invention provides a braking system comprising a brake; a braking control system arranged to control the brake, the braking control system comprising an electric or hydraulic energy source; and a controller according to the second aspect of the invention configured to determine the integrity of the braking control system. Typically the braking system is an aircraft braking system, and the brake is an aircraft brake.

Typically the controller comprises a sensor for taking two or more measurements of voltage or hydraulic pressure from the braking control system; and an electrical control system programmed to operate the braking control system to charge or discharge the energy source, analyse at least two of the measurements in order to determine a change or rate of change in voltage or hydraulic pressure caused by the charging or discharging of the energy source, and determine the integrity of the system by checking whether the change or rate of change in voltage or hydraulic pressure meets predetermined criteria.

Typically the electric or hydraulic energy source is a secondary energy source, and the system further comprises a primary energy source for supplying voltage or hydraulic pressure to the brake, and means (such as a valve or switch) for isolating the secondary energy source from the brake so that the voltage or hydraulic pressure is supplied to the brake by the primary energy source and not by the secondary energy source.

Typically the electric or hydraulic energy source is a secondary energy source, and the system further comprises a primary energy source for supplying voltage or hydraulic pressure to the brake; a first valve or switch which can be selectively activated to couple the primary energy source to the brake and deactivated to decouple the primary energy source from the brake; and a second valve or switch which can be selectively activated to couple the secondary energy source to the brake and deactivated to decouple the secondary energy source from the brake.

In one embodiment the electric or hydraulic energy source is a hydraulic accumulator, and the system further comprises a pump for supplying hydraulic pressure to the brake, and an accumulator selector valve for isolating the hydraulic accumulator from the brake so that the hydraulic pressure is supplied to the brake by the pump and not by the hydraulic accumulator. Optionally the braking system further comprises a normal selector valve which can be deactivated to decouple the pump from the brake, wherein the accumulator selector valve can be activated to couple the hydraulic accumulator to the brake when the pump is decoupled from the brake by the normal selector valve.

Typically the electric or hydraulic energy source has an output line arranged to supply voltage or hydraulic pressure to the brake, and the controller comprises a sensor arranged to take measurements of voltage or hydraulic pressure from the output line.

In the case of a hydraulic energy source, then typically the hydraulic energy source comprises a hydraulic accumulator with a fluid separating device, hydraulic liquid on one side of the fluid separating device, and compressed gas on the other side of the fluid separating device, wherein the hydraulic accumulator has an output line containing hydraulic fluid, and the controller comprises a sensor arranged to take measurements of hydraulic pressure from the output line.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
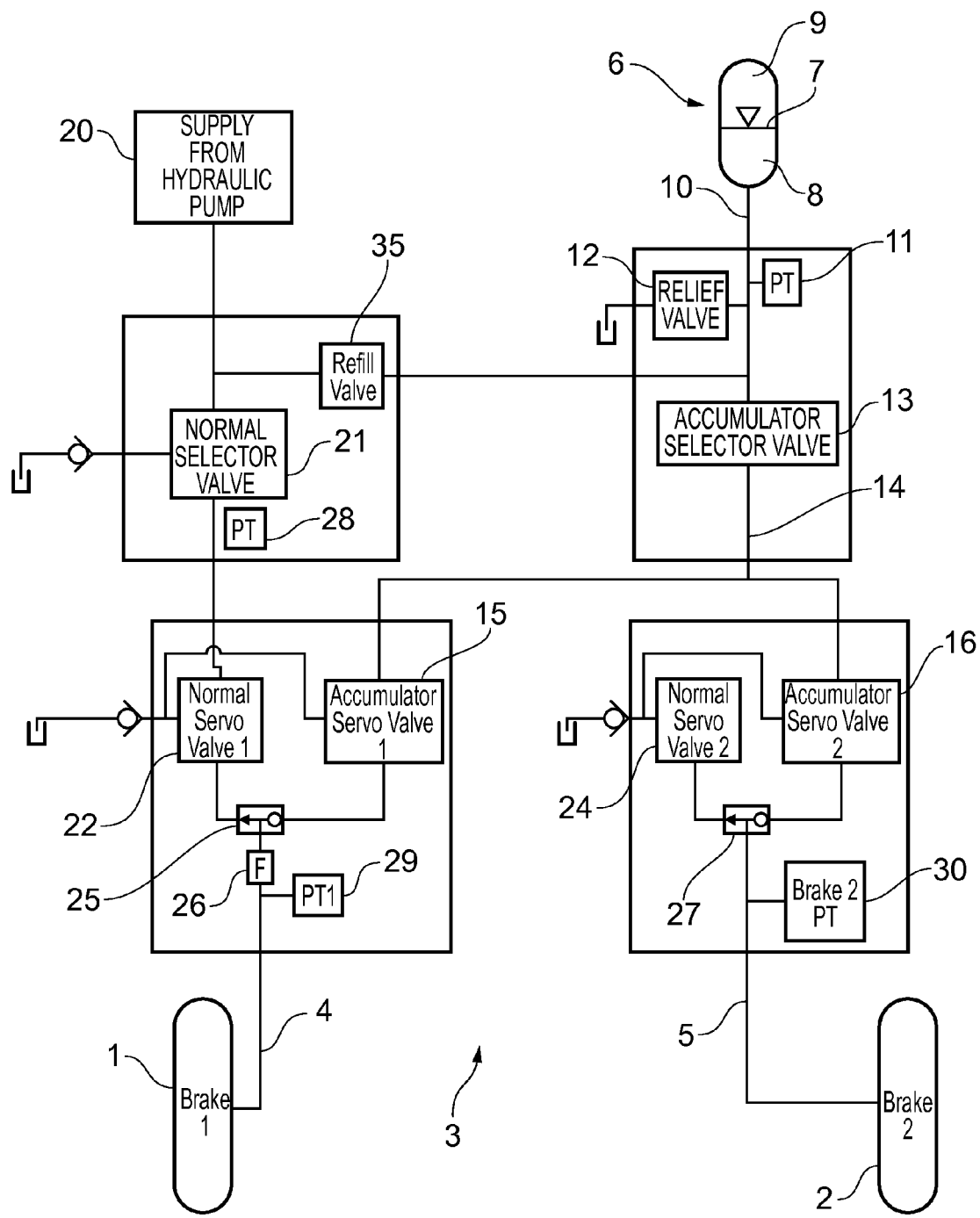
FIG. 1 shows an aircraft braking system.

FIG. 1 shows an aircraft braking system comprising a pair of brakes 1, 2; and a braking control system 3 for applying hydraulic pressure to the brakes on brake lines 4, 5.

The hydraulic accumulator 6 comprises a piston 7 (although the piston 7 could be replaced by a bladder, diaphragm or other fluid separating device) with hydraulic liquid 8 on one side and compressed gas 9 on the other side. The accumulator has an output line 10 with a pressure sensor 11. If the pressure on the output line 10 exceeds a threshold, then a relief valve 12 opens so excess liquid is fed into a reservoir. Further pressure sensors 28-30 are also provided for sensing the pressure at various other parts of the hydraulic system.

The output line 10 leads to an accumulator selector valve 13. When the valve 13 is open the accumulator output line 10 is in fluid communication with a line 14 which splits and leads to a pair of accumulator servo valves 15, 16.

During normal operation, hydraulic pressure on the brake lines 4, 5 is supplied by the hydraulic pump 20. The brake line 4 is supplied via a normal selector valve 21, a normal servo valve 22, a shuttle valve 25, and a filter 26. The brake line 5 is supplied by the pump 20 via a second normal selector valve 23 (shown in FIG. 2 but omitted from FIG. 1 for purposes of clarity), a normal servo valve 24, and a shuttle valve 27. The shuttle valves 25, 27 automatically select the input with the higher pressure.

In the event of failure of the pump 20, or if the pump 20 is unavailable for some other reason, the hydraulic pressure on the brake lines 4, 5 is supplied by the accumulator 6 via the accumulator selector valve 13, the accumulator servo valves 15, 16, and the valves 25, 27.

The pump 20 is used as a primary energy source, and the hydraulic accumulator 6 is used as a secondary energy source. The normal selector valve 21 can be selectively activated to couple the pump 20 to the brakes and deactivated to decouple the pump 20 from the brake. The accumulator selector valve 13 can be selectively activated to couple the accumulator 6 to the brakes and deactivated to decouple the accumulator 6 from the brakes.

During normal operation, the accumulator 6 is isolated from the brake 1,2 by the accumulator selector valve 23 so that the hydraulic pressure is supplied to the brakes 1, 2 by the pump 20 and not by the accumulator 6. In the event of failure of the pump 20, or if the pump 20 is unavailable for some other reason, then the pump 20 is isolated from the brake 1,2 by deactivating the normal selector valve 23 and activating the accumulator selector valve 23 so that the hydraulic pressure is supplied to the brake 1, 2 by the accumulator 6 and not by the pump 20. Therefore the primary and secondary energy sources are not simultaneously coupled to the brakes 1, 2. This provides an element of redundancy which is particularly preferred in the case of an aircraft braking system.

Figure 2:
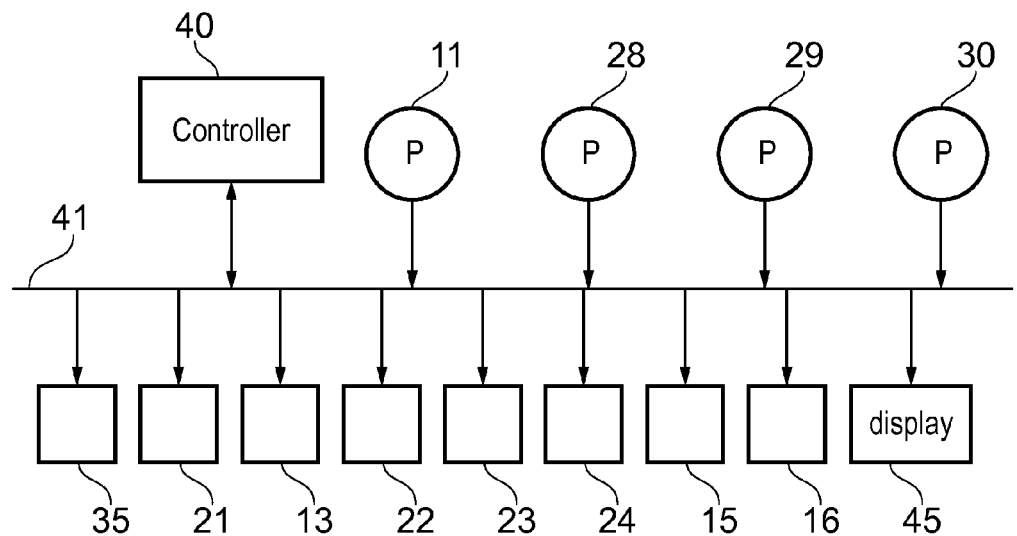
FIG. 2 is a schematic diagram showing an electrical control system for controlling the hydraulic system of FIG. 1.

FIG. 2 is a schematic diagram showing an electrical control system for controlling the hydraulic system of FIG. 1. An avionics computer controller 40 is connected to the various valves and sensors by a bus 41. During normal operation the controller 40 operates the normal selector valves 21, 23 so that hydraulic pressure is maintained by the pump 20, and the accumulator 6 is isolated from the brakes by the accumulator selector valve 13.

In the example of FIG. 2 the controller 40 communicates with the valves via a bus 41, but in an alternative embodiment it can be connected to each valve via a discrete wire.

When braking is required, then the controller 40 issues braking commands to the normal servo valves 22, 24 which increase the pressure on the brake lines 4, 5 in accordance with these braking commands.

When a fault is detected (for instance by a drop in pressure at the sensor 28) then the normal selector valve 21 is deactivated by the controller 40 to decouple the pump 20 from the brakes, and the accumulator selector valve 13 is activated by the controller 40 to couple the accumulator 6 to the brakes. When braking is required then the controller 40 issues braking commands to the accumulator servo valves 15, 16 which increase the pressure on the brake lines 4, 5 in accordance with these braking commands. As the accumulator servo valves 15, 16 increase the pressure, the piston 7 of the accumulator is pushed down by the compressed gas 9 to feed hydraulic liquid into the output line 10 and maintain the system pressure.

Before dispatch of the aircraft, the hydraulic accumulator 6 is filled automatically by the controller 40. The controller 40 determines that the aircraft is before dispatch by seeing the engine master levers turned to the ON position (with the engines still off) while the aircraft is stationary. At this time the controller 40 commands a refill valve 35 to open, which causes the pump 20 to charge the accumulator 6 by pumping hydraulic fluid into the accumulator 6 via the accumulator output line 10.

Opening the refill valve 35 causes the accumulator 6 to be charged by the pump 20. During this charging process the accumulator selector valve 13 is deactivated (closed) so the accumulator 6 is decoupled from the brakes. The normal selector valves 21, 23 may be open or closed during the charging process.

Figure 3:
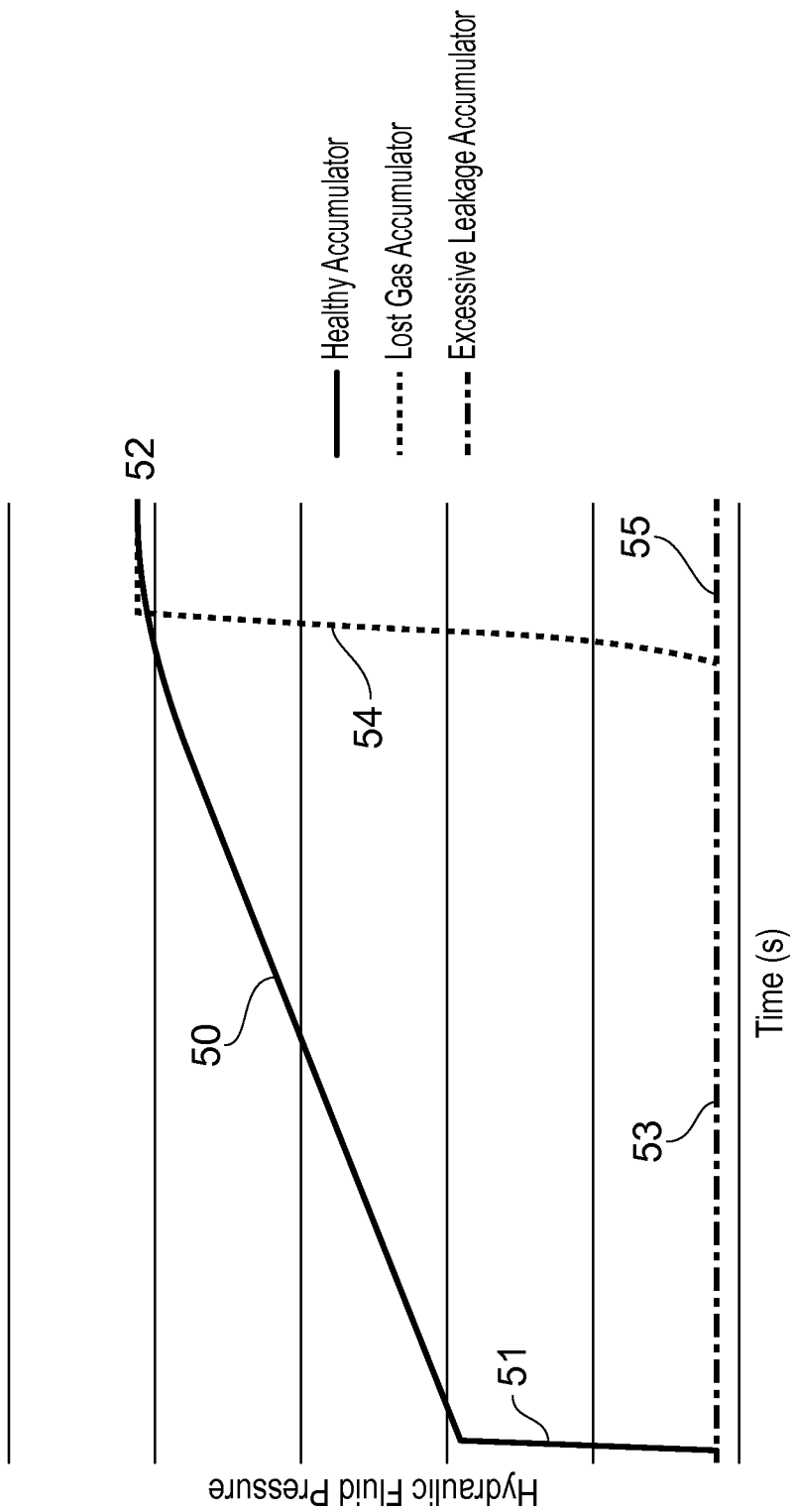
FIG. 3 is a graph showing changes in pressure during filling of the accumulator.

At the same time as the accumulator 6 is charged by the pump with the accumulator selector valve 13 closed, the controller 40 takes a series of measurements of hydraulic pressure from the sensor 11. FIG. 3 is a graph showing at 50, 51 the change in pressure for a healthy accumulator. Initially there is a sharp jump in pressure at 51 as the pump delivers hydraulic liquid until the pressure on the liquid side of the piston 7 matches the pressure on the gas side and the piston starts to move. The pressure then increases gradually and at a constant rate as indicated at 50, as the gas 9 becomes increasingly compressed by the piston 7. The refill command from the controller 40 may stop simply after a predetermined time period has elapsed or alternatively once an accumulator pressure threshold 52 is reached.

If the gas 9 in the accumulator has been lost due to a gas leak on the gas side of the piston 7, then when the refill valve 35 is opened the piston 7 will be forced up with no increase in pressure as indicated at 53 until it reaches its maximum displacement, at which point there will be a sudden and large increase in pressure 54.

If there is a significant liquid leak on the liquid side of the piston 7, then when the refill valve 35 is opened there will be no increase in pressure at any point since the liquid will be continuously leaking from the system. This is illustrated by line 55.

The controller 40 stores the series of pressure measurements from the sensor 11, analyses at least two of the measurements in order to determine an increase or rate of increase in hydraulic pressure caused by the charging of the accumulator 6, and then determines the integrity of the accumulator by checking whether this increase or rate of increase in hydraulic pressure meets predetermined criteria.

A number of different criteria may be used by the controller 40 to determine the integrity of the accumulator. One option is to determine a difference in hydraulic pressure (P2-P1) between two pressure measurements P1, P2 taken over a time period $\Delta T$; determine a temporal rate of change $R=(P2-P1)/\Delta T$ of the pressure over that time period; and check whether it falls between lower and upper thresholds R1, R2 (i.e. $R1<R<R2$). If $R1<R<R2$ then the controller 40 infers that the pressure is increasing gradually as indicated at 50 over that time period so the accumulator is healthy. Another option is to take a first pressure measurement P1 before the refill valve 35 is opened; take a second pressure measurement P2 at some preset time during the charging process after the refill valve 35 has been opened but before the maximum 52 has been reached; and check that the difference (P2-P1) exceeds a certain amount. If not, then this indicates that there is a leak on the liquid or gas side of the piston. Another option is to continuously monitor the rate of change of pressure with respect to time (dP/dT), and if there is a large increase in dP/dT accompanied by a large increase in pressure (indicative of the increase 54) then the controller 40 determines that there has been a gas leak.

As explained above, the controller 40 analyses the series of pressure measurements in order to determine a change or rate of change in pressure caused by the charging of the accumulator, and then determines the integrity of the energy source by checking whether that change or rate of change meets predetermined criteria. This can be contrasted with the integrity check in U.S. Pat. No. 4,835,465 which only checks whether an absolute pressure value is too low. A basic check of this kind would not be able to detect a gas leak in the accumulator, since the pressure would still rise to the maximum 52 as indicated at 54.

Figure 4:
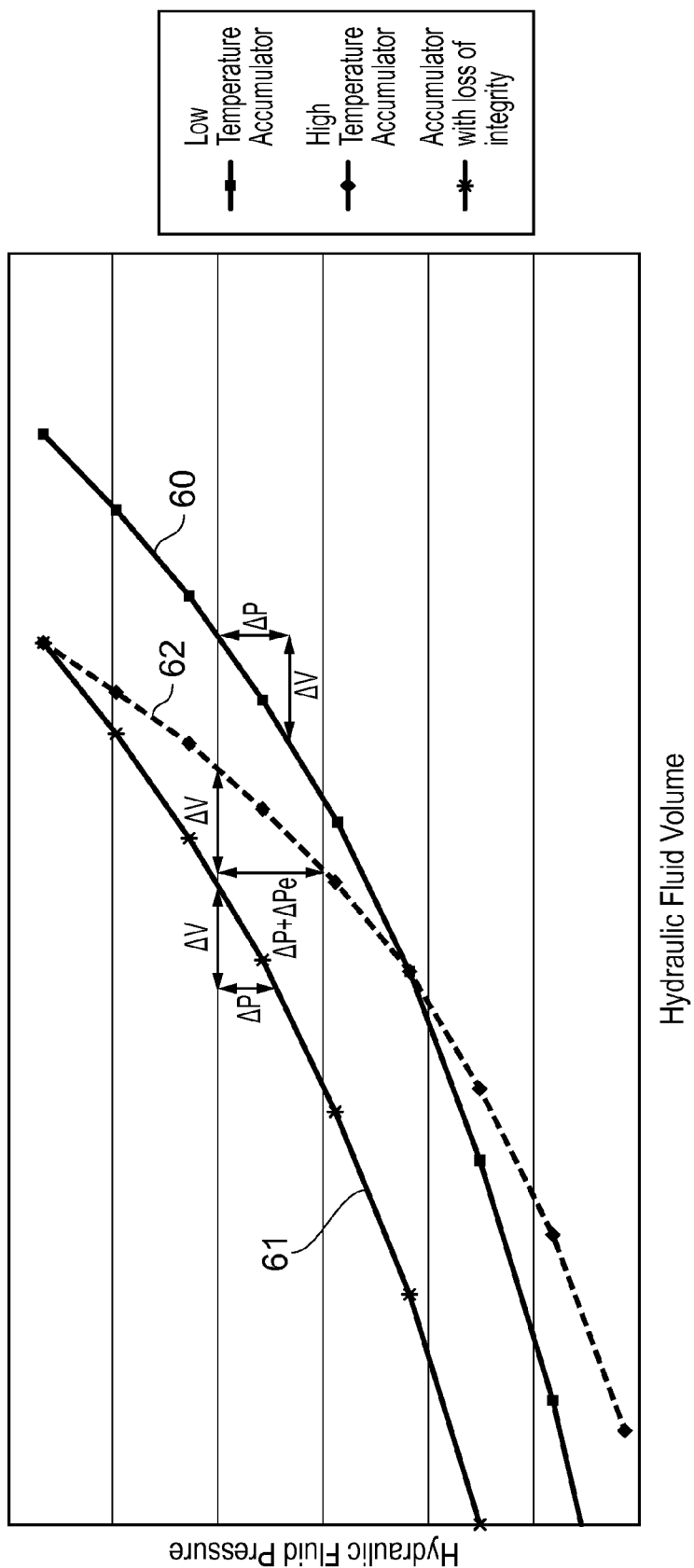
FIG. 4 is a graph showing changes in pressure during operation of the brakes.

Another method of determining the integrity of the accumulator is shown in FIG. 4. Applying the brakes consumes a known volume of liquid. The stored energy within the accumulator 6 provides a specific hydraulic fluid pressure for a given volume, which varies with temperature. Regardless of the temperature, however, the change in pressure from the consumption of a given hydraulic fluid volume is essentially constant.

FIG. 4 shows the variation of hydraulic fluid pressure with hydraulic fluid volume at 60 for a low temperature and at 61 for a high temperature. For both temperatures, a known drop in volume $\Delta V$ gives a known drop in pressure $\Delta P$.

If the accumulator integrity is lost through either a loss of hydraulic fluid or a loss of gas, then the pressure drop from applying the brakes is much larger as indicated by line 62. So for a known drop in volume $\Delta V$, the change in pressure is greater ($\Delta P + \Delta Pe$).

The controller 40 is configured to determine the integrity of the accumulator before landing by the following method. Firstly, the controller 40 switches the valves 21, 13 so the accumulator 6 is coupled to the brakes rather than the pump 20. Next the controller 40 operates the accumulator servo valves 15, 16 by a set amount to operate the brakes 1, 2 and generate a known discharge of volume $\Delta V$ from the accumulator. Since the refill valve 35 is closed to isolate the pump 20 from the accumulator, this discharge causes a drop in pressure. The controller 40 then takes a series of at least two measurements from pressure sensor 11, analyses the measurements in order to determine a reduction or rate of reduction in hydraulic pressure caused by the discharging of the accumulator, and determines the integrity of the accumulator by checking whether this reduction or rate of reduction meets predetermined criteria.

This can be done most simply by taking two measurements P1, P2 (one before the brakes are applied, and one after) and determining whether a difference (P2-P1) between the measurements exceeds the expected difference $\Delta P$. If the difference (P2-P1) significantly exceeds the expected pressure drop $\Delta P$, then there has been a loss of accumulator integrity. Alternatively, multiple pressure measurements P1, P2, P3 etc. may be taken at the same time as the accumulator is discharged in order to determine a series of rate measurements (P2-P1)/$\Delta V1$, (P3-P2)/$\Delta V2$ etc., where $\Delta V1$ and $\Delta V2$ are known changes in volume between these successive pressure measurements.

Similarly, multiple rate measurements with respect to time could be determined. If any of these successive rate measurements exceed an expected rate $\Delta P/\Delta V$ or $\Delta P/\Delta T$ then the controller 40 determines that there has been a loss of integrity.

Once the controller 40 has determined the integrity of the accumulator using one or all of the methods described above, it outputs a message which is displayed on a pilot display device 45, indicating whether or not the accumulator is healthy.

The methods described above have various advantages. Firstly, the methods can be performed automatically without requiring the attention of airline maintenance personnel. This enables the methods to be performed before or during flight of the aircraft, more frequently than can be achieved by a manual method. Another advantage is that a gas pressure sensor on the gas side of the accumulator is not required in order to test its integrity. Rather the method can use a pre-existing sensor on the liquid side of the accumulator, resulting in a reduced weight. It also removes the possibility of a loss of gas via such a gas pressure sensor. Another advantage is that the accurate and reliable nature of the integrity test means that the accumulator need not be oversized, resulting in a reduced weight of the accumulator.

In the hydraulic braking system described above, the primary energy source is a pump 20, and a hydraulic accumulator 6 is used as a secondary energy source. In an alternative embodiment of the invention, the braking system may be an electric braking system in which the primary energy source is an electric generator, and an electric battery is used as a secondary energy source. The methods described above with reference to FIGS. 3 and 4 can be used in such a system, substituting electric charge for liquid volume, and voltage for hydraulic pressure.

Figure 5:
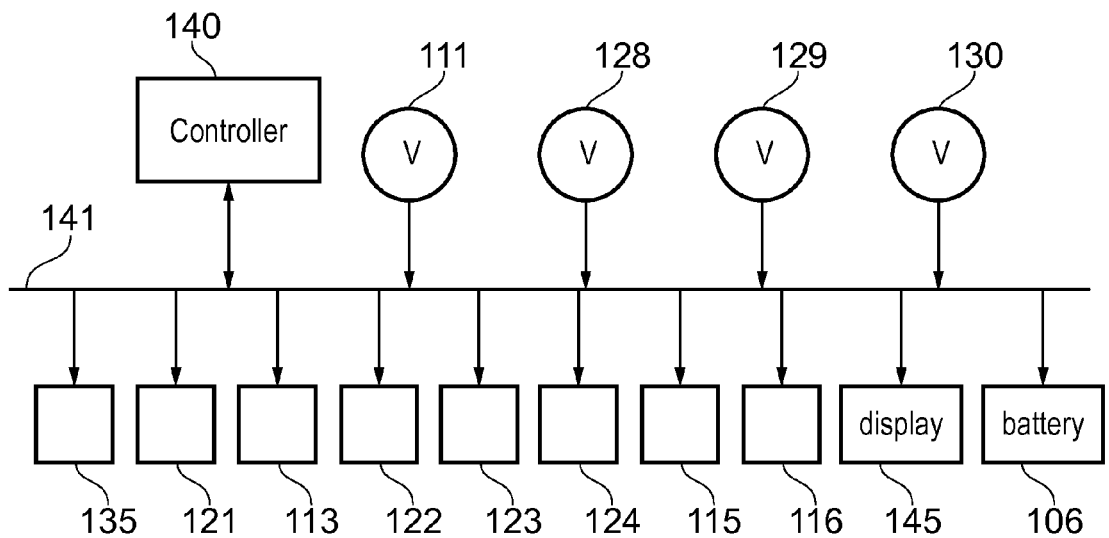
FIG. 5 is a schematic diagram showing a control system for controlling an electric braking system.

FIG. 5 is a schematic diagram showing the principal components of such an electric braking system, with equivalent components to the system of FIG. 2 indicated by the same reference number incremented by 100. An avionics controller 140 is connected to various switches and voltage sensors via a bus 141. During normal operation, the controller 140 operates the normal selector switches 122, 123 and switches 125, 127 so that power is provided from the generator, and the battery 106 is isolated from the brakes. In the event of failure of the generator, or if the generator is unavailable for some other reason, braking energy is supplied by the battery 106.

Before dispatch, the controller 140 operates a method similar to the one described above with reference to FIG. 3. That is, it charges the battery 106; takes a series of voltage measurements in order to monitor a change or rate of change in voltage caused by the charging of the battery; and determines the integrity of the battery by checking whether the monitored change or rate of change in voltage meets predetermined criteria.

Before landing, the controller 140 operates a method similar to the one described above with reference to FIG. 4. That is, it discharges the battery 106 by operating the brakes; takes a series of voltage measurements in order to monitor a change or rate of change in voltage caused by the discharging of the battery; and determines the integrity of the battery 106 by checking whether the monitored change or rate of change in voltage meets predetermined criteria.

Although the invention has been described above with reference to one or more preferred embodiments, it will be appreciated that various changes or modifications may be made without departing from the scope of the invention as defined in the appended claims.

The invention claimed is:

1. A method of determining the integrity of a braking control system, the braking control system comprising an electric or hydraulic energy source, the method comprising: charging or discharging the energy source; taking two or more measurements of voltage or hydraulic pressure from the electric or hydraulic energy source; analysing at least two of the measurements in order to determine a change or rate of change in voltage or hydraulic pressure caused by the charging or discharging of the energy source; and determining the integrity of the system by checking whether the change or rate of change in voltage or hydraulic pressure meets predetermined criteria, wherein said charging of the energy source causes an increase in voltage or hydraulic pressure and wherein said discharging of the energy source causes a decrease in voltage or hydraulic pressure.

2. The method of claim 1, wherein the energy source is charged and the change or rate of change in voltage or hydraulic pressure is an increase or rate of increase in voltage or hydraulic pressure.

3. The method of claim 1, wherein the energy source is discharged and the change or rate of change in voltage or hydraulic pressure is a decrease or rate of decrease in voltage or hydraulic pressure.

4. The method of claim 3, wherein the energy source is discharged by using the energy source to operate one or more brakes.

5. The method of claim 1, wherein the energy source is a hydraulic accumulator, and the measurements are measurements of hydraulic pressure.

6. The method of claim 1, wherein checking whether the change or rate of change in voltage or hydraulic pressure meets predetermined criteria comprises comparing the change or rate of change of the voltage or hydraulic pressure to a threshold.

7. The method of claim 1, wherein the measurements of voltage or hydraulic pressure are taken from the electric or hydraulic energy source at the same time as the energy source is charged or discharged.

8. The method of claim 1, the method comprising discharging the energy source by a predetermined amount; taking a first measurement of voltage or hydraulic pressure from the energy source before the energy source has been discharged by the predetermined amount; taking a second measurement of voltage or hydraulic pressure from the energy source after the energy source has been discharged by the predetermined amount; determining a difference between the first and second measurements; and determining the integrity of the system by checking whether the difference exceeds a threshold.

9. The method of claim 1, wherein the braking control system is an aircraft braking control system.

10. A method of determining the integrity of a braking control system, the braking control system comprising an electric or hydraulic energy source, the method comprising: charging or discharging the energy source; taking two or more measurements of voltage or hydraulic pressure from the braking control system; analysing at least two of the measurements in order to determine a change or rate of change in voltage or hydraulic pressure caused by the charging or discharging of the energy source; and determining the integrity of the system by checking whether the change or rate of change in voltage or hydraulic pressure meets predetermined criteria, wherein the method is performed during flight of the aircraft.

11. The method of claim 1, wherein the electric or hydraulic energy source is a secondary energy source, and the method further comprises supplying voltage or hydraulic pressure to a brake with a primary energy source, and isolating the secondary energy source from the brake so that the voltage or hydraulic pressure is supplied to the brake by the primary energy source and not by the secondary energy source.

12. The method of claim 5, wherein the method further comprises supplying hydraulic pressure to the brake with a pump, and isolating the hydraulic accumulator from the brake with an accumulator selector valve so that the hydraulic pressure is supplied to the brake by the pump and not by the hydraulic accumulator.

13. The method of claim 12, wherein in the event of failure of the pump, or if the pump is unavailable for some other reason, then the hydraulic pressure is supplied to the brake by the hydraulic accumulator via the accumulator selector valve.

14. The method of claim 1, wherein the electric or hydraulic energy source is a secondary energy source, and the method further comprises supplying voltage or hydraulic pressure to a brake with a primary energy source; and when a fault is detected, decoupling the primary energy source from the brake and coupling the secondary energy source to the brake.

15. A controller configured to determine the integrity of a braking control system comprising an electric or hydraulic energy source, the method comprising: charging or discharging the energy source; taking two or more measurements of voltage or hydraulic pressure from the electric or hydraulic energy source; analysing at least two of the measurements in order to determine a change or rate of change in voltage or hydraulic pressure caused by the charging or discharging of the energy source; and determining the integrity of the system by checking whether the change or rate of change in voltage or hydraulic pressure meets predetermined criteria, wherein said charging of the energy source causes an increase in voltage or hydraulic pressure and wherein said discharging of the energy source causes a decrease in voltage or hydraulic pressure.

16. A braking system comprising a brake; a braking control system arranged to control the brake, the braking control system comprising an electric or hydraulic energy source; and a controller configured to determine the integrity of the braking control system by the method of claim 1.

17. The braking system of claim 16, wherein the electric or hydraulic energy source is a secondary energy source, and the system further comprises a primary energy source for supplying voltage or hydraulic pressure to the brake, and means for isolating the secondary energy source from the brake so that the voltage or hydraulic pressure is supplied to the brake by the primary energy source and not by the secondary energy source.

18. The braking system of claim 16, wherein the electric or hydraulic energy source is a hydraulic accumulator, and the system further comprises a pump for supplying hydraulic pressure to the brake, and an accumulator selector valve for isolating the hydraulic accumulator from the brake so that the hydraulic pressure is supplied to the brake by the pump and not by the hydraulic accumulator.

19. The braking system of claim 18, further comprising a normal selector valve which can be deactivated to decouple the pump from the brake, wherein the accumulator selector valve can be activated to couple the hydraulic accumulator to the brake when the pump is decoupled from the brake by the normal selector valve.

20. The braking system of claim 16, wherein the electric or hydraulic energy source has an output line arranged to supply voltage or hydraulic pressure to the brake, and the controller comprises a sensor arranged to take measurements of voltage or hydraulic pressure from the output line.

* * * * *